United States Patent [19]

Shimizu et al.

[11] Patent Number: 4,794,294

[45] Date of Patent: Dec. 27, 1988

[54] VIBRATION WAVE MOTOR

[75] Inventors: Masao Shimizu, Kawasaki; Nobuyuki Suzuki, Yokohama; Mitsuhiro Katsuragawa, Niiza, all of Japan

[73] Assignee: Canon Kabushiki Kaisha, Tokyo, Japan

[21] Appl. No.: 59,782

[22] Filed: Jun. 8, 1987

[30] Foreign Application Priority Data

Jun. 12, 1986 [JP] Japan ................. 61-137602
Jun. 18, 1986 [JP] Japan ................. 61-143924
Jun. 23, 1986 [JP] Japan ................. 61-147794

[51] Int. Cl.[4] .................................. H01L 41/08
[52] U.S. Cl. ............................. 310/316; 310/323
[58] Field of Search ........... 310/316, 317, 323, 328

[56] References Cited

U.S. PATENT DOCUMENTS

| | | | |
|---|---|---|---|
| 4,400,641 | 8/1983 | Vishnevsky et al. | 310/323 |
| 4,491,401 | 1/1985 | Inaba et al. | 354/271.1 |
| 4,510,411 | 4/1985 | Hakamata et al. | 310/323 X |
| 4,513,219 | 4/1985 | Katsuma et al. | 310/328 |
| 4,562,373 | 12/1985 | Tokusima et al. | 310/323 X |
| 4,613,782 | 9/1986 | Mori | 310/323 |
| 4,658,172 | 4/1987 | Izukawa | 310/323 X |
| 4,692,649 | 9/1987 | Izukawa | 310/316 |
| 4,692,672 | 9/1987 | Okuno | 310/323 X |
| 4,713,571 | 12/1987 | Suzuki et al. | 310/316 |
| 4,727,276 | 2/1988 | Izukawa et al. | 310/316 |

FOREIGN PATENT DOCUMENTS 3345274 6/1984 Fed. Rep. of Germany .

OTHER PUBLICATIONS

English Extract from "Lexikon der Elektronik", O. Neufang (Hrsg.), p. 452, 1983.

Primary Examiner—Mark O. Budd
Attorney, Agent, or Firm—Fitzpatrick, Cella, Harper & Scinto

[57] ABSTRACT

A vibration wave motor generates a travelling vibration wave by applying periodic voltages of different phases to electro-mechanical energy transducers located at two different positions on a stator, and drives a movable member by the vibration wave. In order to adjust the speed of the vibration wave motor, the phase difference between the periodic voltages applied to the transducer is adjusted or the application of the periodic voltage to one or both of the transducers is selectively blocked.

11 Claims, 8 Drawing Sheets

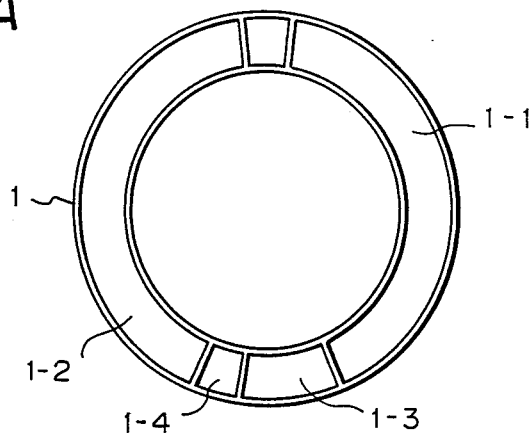
Fig. 1A
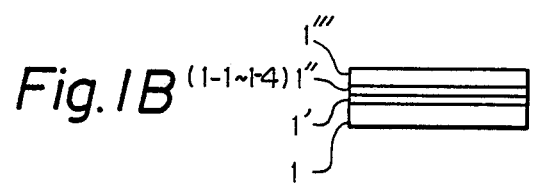
Fig. 1B
Fig. 7 (a) 17(1-1)
(b) Q8
(c) 15(S)
(d) 2(R)

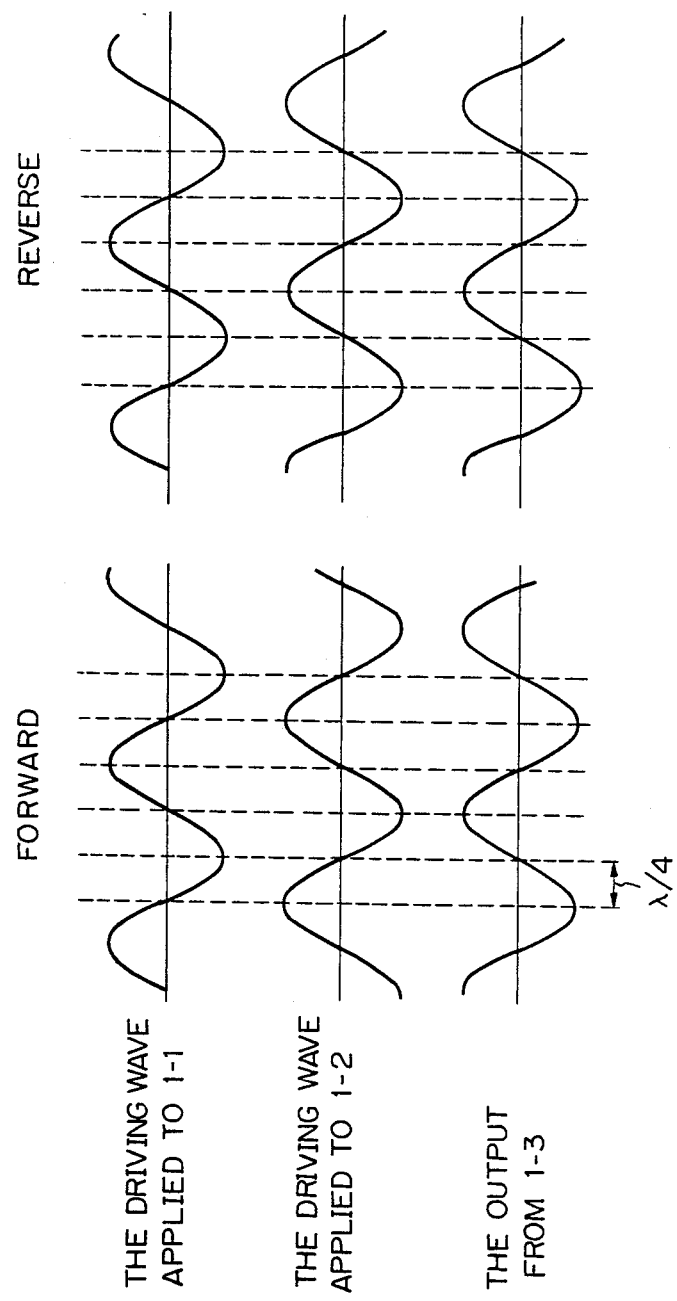

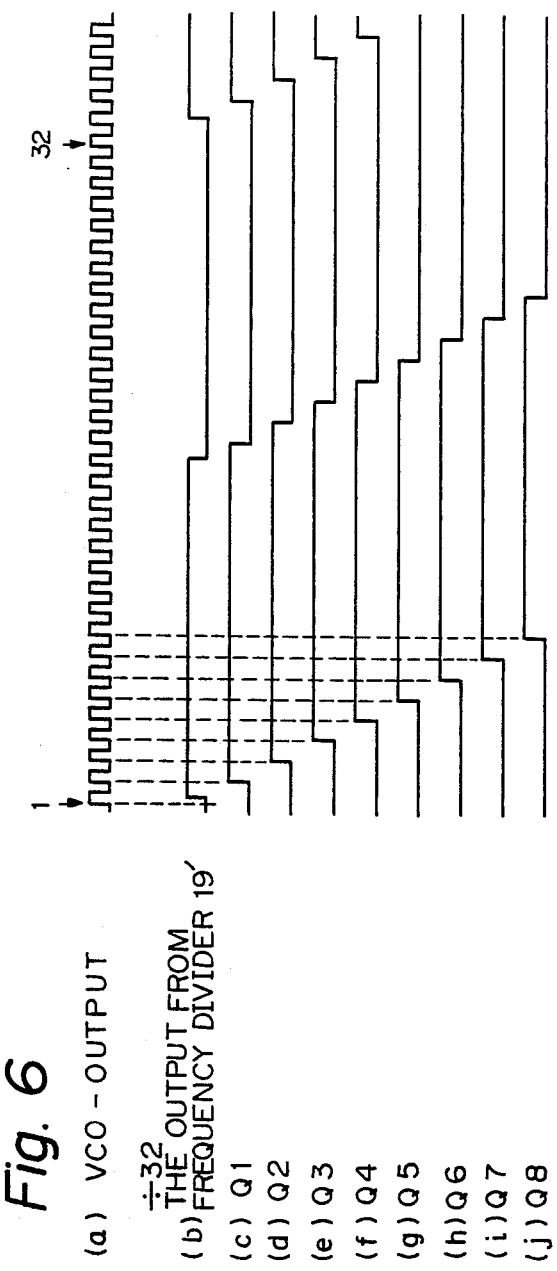

VIBRATION WAVE MOTOR

BACKGROUND OF THE INVENTION

1. Field of the Invention

The present invention relates to an ultrasonic (vibration wave) motor which generates a travelling vibration wave on a stator to drive a movable member, and more particularly to a driver therefor.

2. Related Background Art

In the past, control of the rotating speed of a vibration wave motor has been effected by changing an amplitude of the periodic voltage applied to a stator of the motor. However, since the periodic voltage is usually a high voltage (50-100 volts), a step-up circuit such as a DC-DC converter is necessary when the vibration wave motor is mounted on small portable equipment, such as a camera having a battery as an energy source, and the output voltage of the step-up circuit must be varied for application to the stator of the motor. In order to vary the output voltage of the step-up circuit, a plurality of zener diodes used as reference voltages of the step-up circuit are provided and one of them is selected. This arrangement is complex in configuration. Further, because the voltage is high, high voltage zener diodes are required. As a result, such a device is not suitable for integration and hence cannot be made into compact portable equipment.

The speed may be adjusted by changing the frequency of the periodic voltage from a resonance frequency of the motor. In this method, however, the voltage applied to the electrode may become so high that the stator may be broken.

SUMMARY OF THE INVENTION

It is an object of the invention to adjust the speed of a vibration wave motor by changing the phase difference between periodic voltages of the same frequency applied to drive electrodes.

It is another object of the present invention to control the speed of the vibration wave motor by turning on and off the periodic voltages applied to the drive electrodes of the vibration wave motor to cause the motor repeatedly assume a travelling wave state and a standing wave state so that the ratio of the periods of the traveling wave state and the standing wave state is adjusted.

It is another object of the present invention to cause the vibration wave motor to repeatedly assume a drive state and a stop state and to adjust the ratio of the periods of the drive state and the stop state to control the motor speed.

Other objects of the present invention will be apparent from the following description of the preferred embodiments.

BRIEF DESCRIPTION OF THE DRAWINGS

FIG. 1A shows a front view of the shapes of a stator and electrodes of a vibration wave motor of the present invention, FIG. 1B shows a side view thereof, FIGS. 2A and 2B waveforms applied to or generated at the electrodes of the vibration wave motor, FIGS. 6A-6J show waveforms of the outputs from a VCO 5, a frequency divider 19' and a shift register 20' shown in FIG. 5, FIGS. 7A-7D show waveforms for explaining the operation of the driver shown in FIG. 5.

DETAILED DESCRIPTION OF THE PREFERRED EMBODIMENTS

Figure 3:
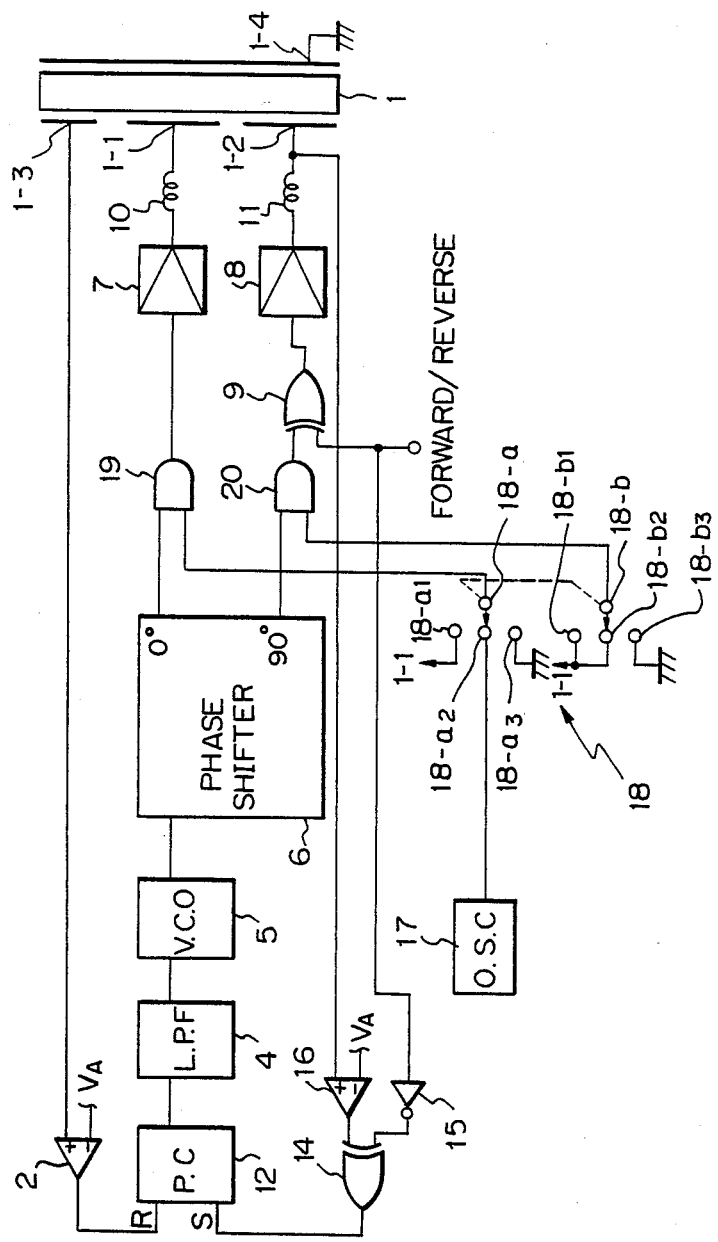
FIG. 3 shows a circuit diagram of an embodiment of the vibration wave motor of the present invention.

FIG. 1A shows electrodes of a stator 1 of the vibration wave motor of the present invention. Numeral 1 denotes a ring-shaped stator on which a polarized electrostrictive element is arranged. Although the electrostrictive element is used in the present embodiment, other electro-mechanical energy transducer elements such as piezoelectric element or magnetostrictive element may be used. Numerals 1-1 and 1-2 denote drive electrodes to which drive waves having a phase difference of 90° are applied. Numeral 1-3 denotes an electrode for detecting a resonance state of the stator, and numeral 1-4 denotes a common electrode which is connected to electrodes facing the electrodes 1-1, 1-2 and 1-3. Since the stator itself is known, the details thereof are omitted. By applying the drive waves (periodic voltages) having the phase difference of 90° to the electrodes, a travelling vibration wave is generated on the surface of the stator. FIGS. 2A and 2B show waveforms to illustrate the phase relationship between the drive signals to the electrodes 1-1 and 1-2 of the stator of the vibration wave motor of FIG. 1B and the output wave of the resonance state detection electrode 1-3. FIG. 2A shows waveforms of the drive signals applied to the electrodes 1-1 and 1-2 when the vibration wave motor is rotated forward, and FIG. 2B shows waveforms of the drive signals applied to the electrodes 1-1 and 1-2 when the vibration wave motor is rotated backward. The position of the electrode 1-3 is selected such that in the resonance state in the forward and backward rotations, the output waveform from the electrode 1-3 is phase-shifted by 90° from the waveform of the drive signal applied to the electrode 1-1. In the present embodiment, since the waveforms of the electrodes 1-1 and 1-3 have a phase difference of 90°, the electrode 1-3 is positioned 90° off the electrode 1-1. The phase difference between the waveforms of the electrodes 1-1 and 1-3 in the resonance state is determined depending on the positional relationship of the electrodes 1-1 and 1-3. Thus, it is not necessary to position the electrodes with 90° shift and to render the phases of the waveforms in the resonance state to be shifted by 90° from each other, but the waveform phases in the resonance state and the electrode position may be set as desired.

FIG. 1B shows a side view of the vibration wave motor. Numeral 1 denotes a stator, numeral 1' denotes the polarized electrostrictive element, and numeral 1″ denotes the electrodes. Those elements are integral. Numeral 1‴ denotes a movable member which is press-contacted to the surface of the stator assembly (1, 1′, 1″) and driven by a travelling vibration wave generated on the surface of the stator. By applying the periodic signals of different phases to the electrodes 1-1 and 1-2 of the vibration wave motor, the travelling vibration wave is generated on the surface of the stator and the movable member is driven by the vibration wave.

The electrostrictive element 1′ may be polarized or individual electrostrictive elements may be arranged on the stator.

FIG. 3 shows a circuit diagram of one embodiment of the driver of the vibration wave motor of the prssent invention. Numeral 1 denotes the stator shown in FIG. 1, and numerals 1-1 to 1-4 denote the electrodes shown in FIG. 1. Numerals 2 and 16 denote level comparators. A ⊕ input terminal of the comparator 2 is connected to the detection electrode 1-3, and a ⊖ input terminal is connected to a reference voltage VA. A ⊕ input terminal of the comparator 16 is connected to the drive electrode 1-2, and a ⊖ input terminal is connected to the reference voltage VA. Thus, the waveforms of the electrodes 1-2 and 1-3 are converted to logical levels (pulses). Numeral 15 denotes an inverter and numeral 14 denotes an exclusive OR gate (ex-OR).

Numeral 12 denotes a phase comparator having one input terminal thereof connected to the output of the comparator 2 and the other input terminal thereof connected to the output of the exclusive OR gate 14. The phase comparator 12 is disclosed in U.S. Pat. No. 4,291,274 and hence the details thereof are omitted. It produces an output only when a phase difference between the input signals is detected.

Figure 10:
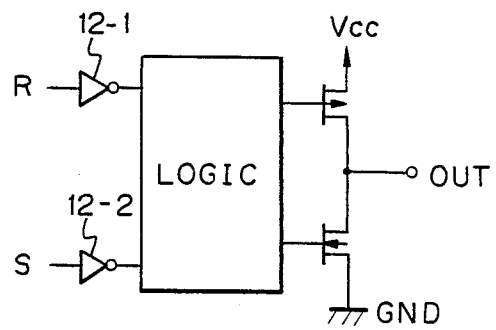
FIG. 10 shows a block diagram of a comparator 12 shown in FIG. 3.
Figure 11:
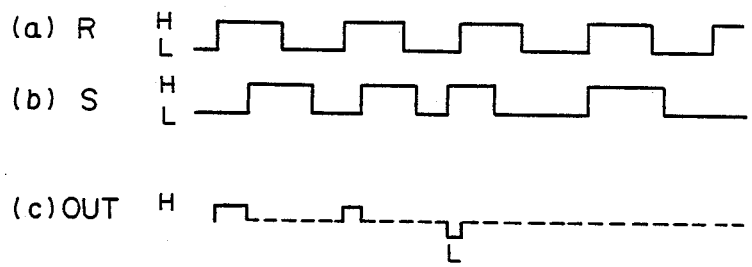
FIG. 11 shows waveforms of the input and output of the comparator 12.

A block diagram and an input/output characteristic of the comparator 12 are shown in FIGS. 10 and 11. When an input pulse (rising signal) to an input terminal R is applied earlier than a rising signal to an input terminal S, the output is Vcc (high level signal H) only during a period of difference between the rising signals, and the output is open (high impedance) upon the input of the rising signal to the input terminal S.

When the input pulse (rising signal) to the input terminal S is applied earlier than the rising signal to the input terminal R, the output is at a ground level (low level L) during the period of the rising signal.

The output is open during other than H or L output state. Thus, when the phase difference is zero, the output is kept open.

Numeral 4 denotes a low-pass filter which filters the output of the comparator 12. Numeral 5 denotes a voltage controlled oscillator (VCO) which produces a signal having a duty factor of 50% at a frequency determined by the input voltage supplied from the output of the low-pass filter 4. Numeral 6 denotes a phase shifter which produces signals having one-half of the frequency of the output of the VCO in two channels having a 90° phase shift therebetween. One of the two output signals having the 90° phase difference from the phase shifter 6 is applied to an AND gate 19, and the other output signal is applied to an AND gate 20. Outputs of a switch 18 are supplied to the AND gates 19 and 20, respectively. An exclusive OR gate (ex-OR) 9 receives a signal from a forward/backward terminal and the output of the AND gate 20. Numerals 7 and 8 denote drive circuits having inputs thereof connected to the outputs of the AND gate 19 and the exclusive OR gate 9, respectively. Numerals 10 and 11 denote inductors which are connected to the drive circuits 7 and 8, respectively. The output square waves (pulses) of the drive circuits 7 and 8 are converted to sine waves as shown in FIG. 2 for use as the drive waves to the electrodes 1-1 and 1-2.

Numerals 18-a and 18-b denote switches for selecting one of three modes, full speed, stop, and slow drive of the vibration wave motor. The full speed, slow and stop modes correspond to 18-a$_1$, 18-b$_1$; 18-a$_2$, 18-b$_2$; and 18-a$_3$, 18-b$_3$, respectively. Numeral 17 denotes a variable duty factor oscillator to attain the slow drive mode.

The operation of FIG. 3 is will now be explained.

It is assumed that the forward/backward terminal to select the forward or backward rotation of the vibration wave motor is now forced to logical L level. If the switch 18 is connected to 18-a$_3$, 18-b$_3$ (stop mode), the inputs to the AND gates 19 and 20 are L and the AND gates 19 and 20 are closed so that the drive signals are not supplied to the stator 1. In the full speed mode, that is, when the switch 18 is connected to 18-a$_1$, 18-b$_1$ to produce the H outputs and the forward/backward terminal is forced to logical L level, the AND gates 19 and 20 and the exclusive OR gate 9 gate the outputs of the phase shifter 6 and the signals from the shifter 6 having the 90° phase difference therebetween are applied to the electrodes 1-1 and 1-2 through the drive circuits 7 and 8. The output of the drive circuit 8 is applied to th electrode 1-2 and also to the level comparator 16 where it is converted to a logical level. As described above, the outputs of the drive circuits 7 and 8 are square waves but they are converted to the sine waves shown in FIG. 2 through the coils 10 and 11. Since the output of the inverter 15 is H, the exclusive OR gate 14 functions as an inverter so that it inverts the drive wave of the electrode 1-2 of FIG. 2A to produce a signal of the same phase and same frequency of those of the output signal of the output electrode 1-3, and it is phase-compared by the phase comparator.

The circuits other than the switch 18 and the oscillator 17 are designed such that the vibration wave motor is always driven at the resonance frequency. When it is driven at the resonant frequency, a phase difference between the signal of the drive electrode 1-1 and the signal of the output electrode 1-3 is in the predetermined relation as shown in FIG. 2. (It is 90° in the present embodiment.) However, the resonance point of the vibration wave motor shifts by a change in the external environment, such as a temperature change. As a result, the drive frequency from the voltage control oscillator (VCO 5), which has been at the resonance frequency of the stator 1 is no longer at the resonance frequency and the phase difference between the signal of the output electrode 1-3 and the electrode 1-1 deviates from the predetermined phase (90°). This phase shift is detected to maintain the predetermined phase relationship so that the drive frequency always kept at the resonance frequency. If the phase of the output of the level comparator 2 applied to the R input terminal of the phase comparator 12 is in advance of the phase of the output of the exclusive OR gate 14 (the S input of the comparator 12), the output of the phase copparator 12 is H for a period corresponding to the phase difference between the inputs. This output is filtered by the low-pass filter 4 and supplied to the voltage control circuit 5 which increases the oscillation frequency by an amount corresponding to theooutput of the low-pass filter 4. This frequency is converted to two outputs having a 90° phase difference therebetween by the phase shifter 6, and they are supplied to the AND gates 19 and 20. As the result, the phase of wave form input into S input advances, compared with the previous phase thereof. On the other hand, if the phase of the output of the level comparator 2 is behind the phase of the output of the exclusive OR gate 14, the phase comparator 12 produces the L output for a period corresponding to the phase difference. As a result, the voltage controlled oscillator 5 lowers the oscillation frequency. The phase difference between the signals of the electrodes 1-1 and 1-3 reduces further as the drive frequency increases. Thus, the phase difference between the signals of the electrodes 1-1 and 1-3 is maintained at 90°. In this manner, negative feedback is effected and the phase relationship between the drive electrode 1-1 and the output electrode 1-3 is maintained constant and the vibration wave motor is driven at the optimum frequency (resonance frequency).

When the switch 18 is connected to 18-a$_2$, 18-b$_2$ (slow speed mode), the AND gate 19 produces the H and L outputs in accordance with a duty factor of the output signal of the oscillator 17. Thus, the AND gate 19 is repeatedly opened and closed to gate and block the input to the drive electrode 1-1. When the output of the oscillator 17 is H, the outputs of the switch 18 are H as they are when the switch 18 is connected to 18-a$_1$ and 18-b$_1$. As a result, the travelling vibration wave is generated on the stator 1. When the output of the oscillator 17 is L, the output of the AND gate 19 is also L and the input to the drive electrode 1-1 is blocked, but the output from the phase shifter 6 is applied to the drive electrode 1-2 because the H signal of the switch 18-b$_2$ is applied to the AND gate 20. Accordingly, no travelling vibration wave is generated on the stator 1 but only the standing wave is generated.

Thus, the travelling vibration wave and the standing wave are repeatedly generated on the stator 1 in accordance with the duty factor of the oscillator 17. A friction coefficient between the movable member and the stator 1 when the standing wave is generated on the stator 1 is smaller than that when the standing wave is not generated. Accordingly, the rotation is maintained and stable speed change is attained without significantly losing the drive to the movable member. The frequency of the oscillator 17 for the above rotation is preferably 100 Hz—several hundreds Hz.

By changing the duty factor between 0% and 100%, the movable member can be driven at any speed between the stop and the full speed. By driving by the standing wave from the beginning of the drive, the movable member can be readily rotated by a manual operation.

When the motor is to be rotated backward, the forward/backward terminal is forced to the logical H Level and the exclusive OR gate 9 inverts the input thereto. Thus, it inverts the signal output from the phase shifter 6 which is 90° phase-shifted with respect to the signal to the electrode 1-1. As a result, the waveforms to the electrodes shown in FIG. 2B are produced and the vibration wave motor is rotated backward.

The inverter 15 now produces the L output and the exclusive OR gate 14 gates the input signal from the level comparator 16. The phase comparator 12 compares the phase of the drive electrode 1-2 and the phase of the output electrode 1-3, and the voltage controlled oscillator 5 oscillates at the resonance frequency as it does in the forward mode.

In the present embodiment, when the standing wave is to be generated, the output of the oscillator is applied only to the drive electrode 1-1. Alternatively, the same signal (same frequency, same phase) may be applied to the drive electrodes 1-1 and 1-2.

In the present embodiment, the rotary motor is illustrated, although the present invention is also applicable to linear vibration wave motor.

As explained above, by repeatedly driving the movable member by the travelling vibration wave and the standing wave, the speed of the movable member is not rapidly changed and the stable speed change is attained.

By the simple circuit configuration which varies the time period of the travelling vibration wave and the time period of the standing wave, a compact motor can be manufactured and any desired speed is attained.

Figure 4:
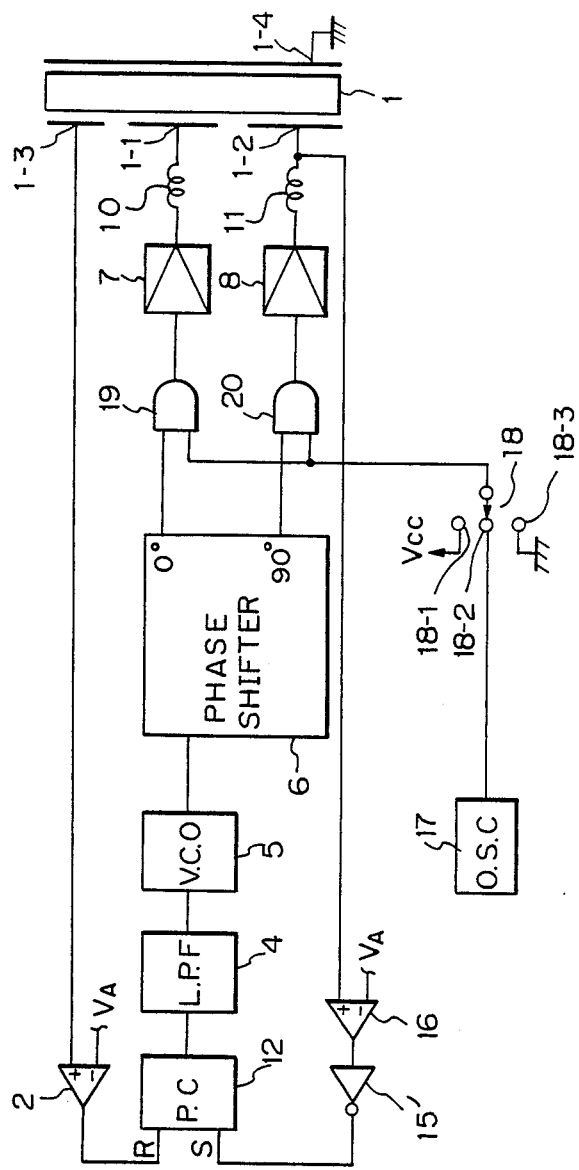
FIG. 4 shows a circuit diagram of another embodiment of the vibration wave motor of the present invention.

FIG. 4 shows a circuit diagram of another embodiment of the present invention. Similar or the same as those shown in FIG. 3 are designated by the same numerals. The present embodiment differs from the embodiment of FIG. 3 in that the speed is controlled by repeating the generation and stopping of the travelling vibration wave.

The operation of the embodiment of FIG. 4 is same as that in the forward mode of the embodiment of FIG. 3 and a detailed explanation thereof is omitted. By connecting the switch 18 to 18-1, the periodic signals having a 90° phase dffference are applied to the electrodes 1-1 and 1-2 from the phase shifter 6 through the gates 19 and 20 so that the full speed drive mode is established. By connecting the switch 18 to 18-3, the gates 19 and 20 are closed and the motor stops.

When the switch 18 is connected to 18-2, the signals having the 90° phase shift are applied from the phase shifter 6 to the electrodes 1-1 and 1-2 through the gates 19 and 20 while the pulse from the oscillator 17 is H so that the travelling vibration is generated. When the pulse from the oscillator 17 is L, the gates 19 and 20 are closed and the application of the signals of the phase shifter 6 to the electrodes 1-1 and 1-2 is inhibited. As a result, the periodic signals are intermittently applied to the electrodes 1-1 and 1-2 and the motor speed is lowered compared to the full speed. By changing the duty factor of the pulse from the oscillator 17, the speed is variable in accordance with the duty factor.

In the embodiment of FIG. 4, the motor speed is thus controlled by repeating the generation and stopping of the travelling vibration wave.

Figure 5:
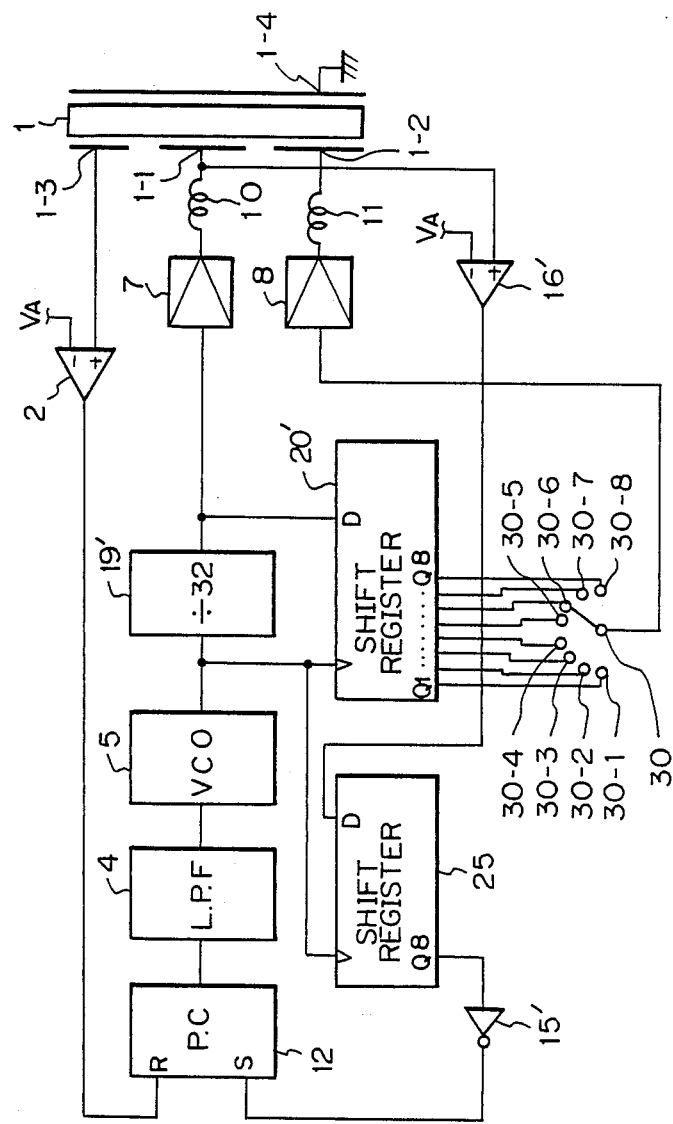
FIG. 5 shows a circuit diagram of another embodiment of the vibration wave motor of the present invention.

FIG. 5 shows a circuit diagram of another embodiment of the present invention. Similar to those shown in FIG. 4 are designated by the same numerals, and the explanation thereof is omitted.

In FIG. 5, numeral 19' denotes a frequency divider which divides the frequency of the output of the VCO 5 by a factor of 32. The output of the frequency divider is applied to the electrode 1-1 through an amplifier 7 and a coil 10. The output of the frequency divider 19' is also connected to a D input terminal of an eight-stage shift register 20'. The output of the VCO 5 is applied, as a clock pulse, to a clock terminal of the register 20'. Since the frequency of the VCO 5 is 32 times as high as the frequency of the output pulse of the frequency divider 19', the frequency of the clock pulse of the register 20' is also 32 times as high as the frequency of the D input. Thus, the outputs $Q_1$–$Q_8$ of the shift register 20' are shifted (retarded) with respect to the D input signal by 0° to 90° at a pitch of 11.25°. In the present embodiment, the oscillation frequency of the VCO 5 is 32 times as high as the resonance frequency. The outputs $Q_1$–$Q_8$ of the shift register 20' are applied to terminals 30-1 to 30-8 of a speed selection switch 30, and the output of the register 20' selected by the switch 30 is applied to the electrode 1-2 through the amplifier 8 and the coil 11.

Numeral 25 denotes an eight-stage shift register. The output of the comparator 16' is applied to a D input terminal of the register 25 and the output of the VCO 5 is applied to a clock input terminal. Thus, an output terminal $Q_8$ produces a pulse which is retarded by 9020 with respect to the input signal to the D input terminal. Namely, since the output pulse of the frequency divider 19' and the output pulse of the comparator 10' are of the same phase, the eighth stage output $Q_8$ of the shift register 25, which receives the output pulse of the comparator 16' as the D input and the output of the VCO 5 as the clock, is a pulse which is retarded by 9020 with respect to the D input signal or the signal of the electrode 1-1. The output $Q_8$ of the shift register 25 is applied to an S input of a phase comparator 12 through an inverter 18. The electrodes 1-1 and 1-3 are arranged with a 9020 phase shift therebetween.

The embodiment of FIG. 5 is different from the embodiment of FIG. 4 in that the output of the VCO 5 is supplied to the amplifier 7 through the frequency divider 19', and the shift registers 20' and 25 are provided.

The operation of the embodiment of FIG. 5 is now explained.

When a power switch, not shown, is turned on, a power is supplied to the circuit and the VCO 5 starts to oscillate at a predetermined frequency. The output of the VCO 5 (FIG. 6A) is used as the shift clocks to the shift registers 20' and 25 and also applied to the frequency divider 19' which produces a pulse of 1/32 frequency (FIG. 6B), which is applied to the amplifier 7. The output pulse of the amplifier 7 is converted to a sine wave by a resonance circuit comprising the coil 10 and the electrode 1-1 and it is applied to the drive electrode 1-1 as a result, the sine wave having the same phase and frequency as those of the pulse shown in FIG. 6B is applied to the electrode 1-1.

On the other hand, the output of the frequency divider 19' is applied to the D input terminal of the shift register 20', to which the output pulse of the VCO 5 is applied as a shift clock. Thus, the outputs $Q_1$–$Q_8$ of the shift registers 20' are retarded by one pulse period of the VCO output with respect to the output of the frequency divider 19', as shown in FIGS. 6C–6J. Since the output frequency of the frequency divider 19' is 1/32 of the VCO output frequency, the outputs of the register 20' are retarded with respect to the preceding stage outputs by 360°/32=11.25°, and the output $Q_8$ is retarded with respect to the frequency divider output (FIG. 6B) by 11.25°×8=90°.

If the switch 30 is connected to the contact 30-8, the output $Q_8$ of the register 20' is applied to the electrode 1-2 through the amplifier 8 and the coil 11 after it has been converted to the sine wave. Thus, the periodic voltages of different phases are applied to the electrodes 1-1 and 1-2.

In the vibration wave motor, the electro-rotation conversion efficiency is at a maximum when a phase difference between the voltage applied to the first group of electrostrictive elements (electrostrictive elements on the electrode 1-1) and the voltage applied to the second group of electrostrictive elements (electrostrictive elements on the electrode 1-2) is equal to 90°, the efficiency decreases as the phase difference decreases, and the efficiency is zero (that is, the motor stops) when the phase difference is zero.

Accordingly, when the switch 30 is connected to the contact 30-8, the motor is rotated at the maximum efficiency, and when the switch 30 is connected to the contact 30-7, 30-6, 30-5, 30-4, 30-3, 30-2 or 30-1, the rotation efficiency is lowered and the motor rotation speed is lowered. In accordance with the present embodiment, the motor rotation speed is varied by selecting one of the contacts 30-1 to 30-8 by the switch 30.

In this manner, the motor rotation speed is controlled. In the present embodiment, the frequency is controlled such that the motor is always driven at the resonance frequency.

The frequency control is now explained. The output of the electrode 1-3 is converted to a pulse by the comparator 2, and the pulse is applied to an R input terminal of the comparator 12. On the other hand, the output of the electrode 1-1 is converted to a pulse by the comparator 16', and the pulse is applied to the D input terminal of the register 25. Since the shift clock pulse of the register 25 is the output of the VCO 5, the output $Q_8$ of the shift register 25 is retarded with respect to the waveform of the electrode 1-1 by 90°.

The output pulse $Q_8$ of the register 25 is inverted by the inverter 18, and the inverted pulse is applied to the S input terminal of the phase comparator 12. The output pulse $Q_8$ of the register 25 is rotarded by 9020 with respect to the pulse applied to the amplifier 7 (FIG. 7A) as shown in FIG. 7B. This pulse is inverted by the inverter 15' and the inverted pulse is applied to the S input terminal of the comparator 12. Thus, the pulse to the S input terminal of the comparator 12 is advanced by 90° with respect to the pulse of FIG. 7A, as shown in FIG. 7C.

Accordingly, if the phases of the pulse to the S input terminal of the comparator 12 and the pulse to the R input terminal of the comparator 12 are equal, there is a 90° phase difference between the electrodes 1-3 and 1-1 and the resonance state is detected. Since the comparator 12 keeps the output open if the phases of the input signals to the input terminals R and S are equal, the VCO 5 keeps the oscillation state and the motor is kept driven at the resonance frequency.

When the motor is not in the resonance state, the phase of the signal of the electrode 1-3 is advanced or retarded from the phase state in which the signal of the electrode 1-3 and the signal of the electrode 1-1 have the 90° phase difference therebetween. As a result, the phases of the pulses to the R and S input terminals of the comparator 12 are not equal. For example, as shown in FIG. 11, if the rising signal of the pulse to the R input terminal of the comparator 12 is generated earlier than the rising signal of the pulse to the S input terminal, the output of the comparator 12 is H for a period corresponding to the difference between the rising times. On the other hand, if the rising signal to the S input terminal is generated earlier than the rising signal to the R input terminal, the output of the comparator 12 is L for a period corresponding to a difference between the rising times. If the phase of the pulse of the comparator 2 or the waveform of the electrode 1-3 is advanced with respect to the phase of the pulse from the inverter 15', that is, if the phase difference between the waveforms of the electrodes 1-1 and 1-3 is more than 90°, the output of the comparator 12 is H for a period corresponding to the phase difference, and the H output is applied to the VCO 5 through the low-pass filter 4. As a result, the input voltage to the VCO 5 rises and the oscillation frequency of the VCO 5 arises accordingly. As the oscillation frequency of the VCO 5, that is, the drive frequency to the electrodes 1-1 and 1-2 rises, the phase of the signal to the electrode 1-1 advances with respect to the phase of the signal to the electrode 1-3. Accordingly, the phase difeerence between the electrodes 1-1 and 1-3 is controlled toward 90°.

On the other hand, if the phase difference between the electrodes 1-1 and 1-3 is less than 90°, the rising signal to the S input terminal of the comparator 12 is generated earlier than the rising signal to the R input terminal, and the output of the comparator 12 is L for a period corresponding to the phase difference and the oscillation frequency of the VCO 5 falls. As a result, the drive frequency to the electrodes 1-1 and 1-2 falls and the phase difference between the electrodes 1-1 and 1-3 increases. Thus, the phase difference between the electrodes 1-1 and 1-3 is controlled toward 90°.

In this manner, the phase difference between the waveforms of the electrodes 1-1 and 1-3 is detected and the drive frequency of the vibration wave motor is controlled such that the phase difference is always maintained at 90°. The motor is always driven in the resonant state.

Figure 8:
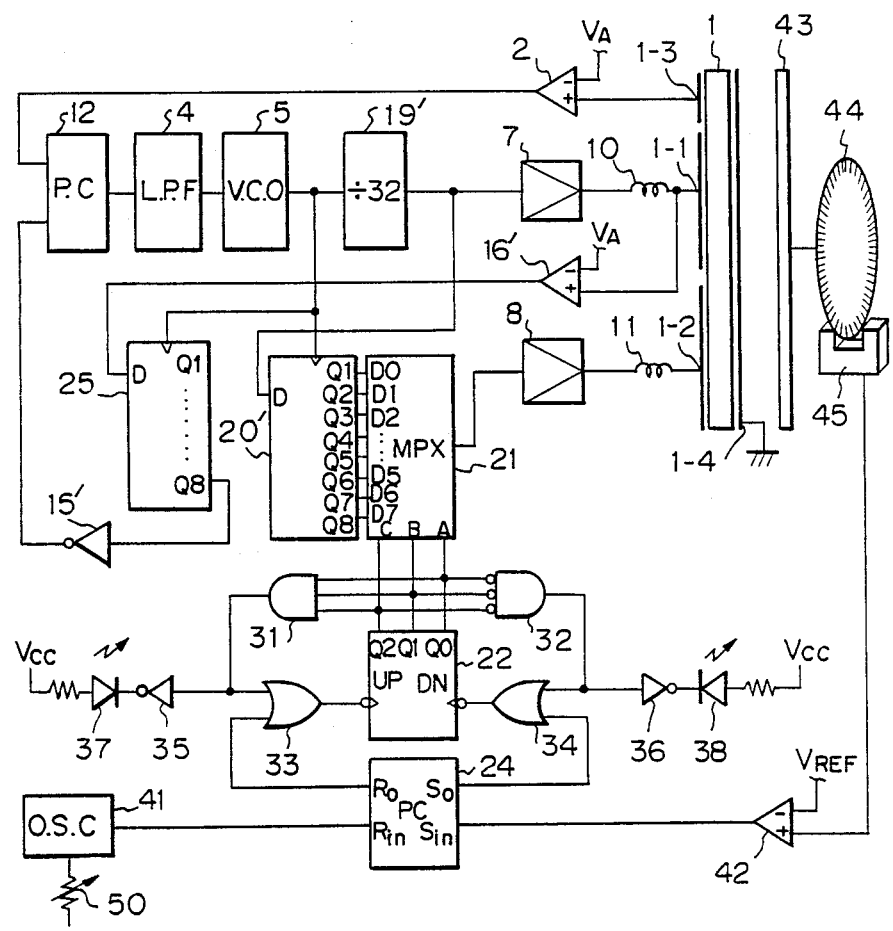
FIG. 8 shows a circuit diagram of another embodiment of the driver of the vibration wave motor of the present invention.

FIG. 8 shows a circuit diagram of other embodiment of the present invention. Elements similar to those shown in FIG. 5 are designated by the same numerals.

In FIG. 8, numeral 21 denotes a multiplexor which receives the outputs $Q_1$-$Q_8$ of the shift register 20' at its input terminals $D_0$-$D_7$, select one of the input terminals $D_0$-$D_7$ in accordance with code input signals to control terminals A, B and C, and outputs the output of the register 20' applied to the selected input terminal. The multiplexor 21 is designed to select the more succeeding stage output of the register 20' as the binary signals applied to the terminals A, B and C as the input code signals increase.

Numeral 41 denotes a pulse oscillator having a potentiometer 50 for setting a motor rotation speed. The frequency of the output pulse is variable in accordance with the resistance of the potentiometer 50.

Figure 9:
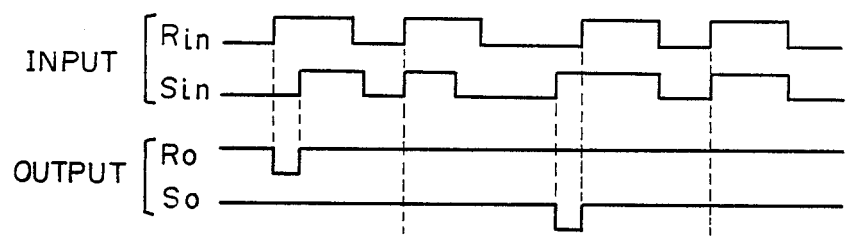
FIG. 9 shows waveforms for explaining the operation of a comparator 24 shown in FIG. 8.

Numeral 43 denotes a movable member which is rotated by a travelling vibration wave generated on a stator of the motor, and numeral 44 denotes a pulse plate which is rotated with the rotation of the movable member. Light transmitting patterns are formed on the pulse plate 44 at a predetermined interval. Numeral 45 denotes a photo-reflector including a light source and a photo-transistor. Each time the light transmitting pattern passes through the reflector 45 as the pulse plate 44 rotates, the photo-reflector 45 produces a pulse. Thus, it produces a number of signals corresponding to a rotation speed of the pulse plate. Numeral 42 denotes a comparator for converting the signal from the reflector 45 to a pulse, and numeral 24 denotes a phase comparator having input terminals Rin and Sin. As shown in FIG. 9, when a rising signal to the input terminal Rin is supplied earlier than a rising signal to the input terminal Sin, an output $R_0$ of the phase comparator 24 is L for a period corresponding to the phase difference, and if the rising signal to the input terminal Sin is supplied earlier than the rising signal to the input terminal Rin, an output $S_0$ of the phase comparator 24 is L for a period corresponding to the phase difference.

Numeral 22 denotes an up/down counter connected to the output terminals $R_0$ and $S_0$ of the phase comparator 24 through OR gates 33 and 34. The counter 22 operates in response to a falling signal of the input.

Numeral 31 denotes an AND gate which receives the outputs $Q_0$-$Q_2$ of the counter 22, numeral 32 denotes an inverted input AND gate, numerals 35 and 36 denote inverters and numerals 37 and 38 denote light emitting diodes.

The operation of the embodiment of FIG. 8 is now explained.

When a power switch, not shown, is turned on, a predetermined count is set in the counter 22 by a power-up setting circuit, not shown, and the multiplexor 21 selects a pulse from a predetermined output terminal of the register 20' and supplies the selected pulse to the amplifier 8.

As the power is turned on, the circuit is activated and the sine waves having the phases of the output of the frequency divider 19' and the output pulse of the multiplexor 21, at the resonance frequency, are applied to the drive electrodes 1-1 and 1-2 as the drive signals, in the manner described in the embodiment of FIG. 5. Thus, the motor is rotated. The rotation of the motor is detected by the reflector 45, and the pulse at the frequency determined by the rotation speed is supplied to the input terminal Sin of the comparator 24 through the comparator 42. The preset speed is set in the potentiometer 50 so that the pulse oscillator 41 generates a pulse of the frequency determined by the preset speed, and it is supplied to the input terminal Rin of the comparator 24. Let us assume that the rotation speed of the motor is slower than the preset speed.

In this case, since the pulse frequency from the comparator 42 is lower than the pulse frequency from the pulse oscillator 41, the number of pulses to the input terminals Rin of the comparator 24 is larger than the number of pulses to the input terminal Sin. That is to say, the rising of a signal input into Rin occurs prior to the occurrence of the rising of a signal input into Sin. As a result, the output $R_0$ of the comparator 24 is L, which causes the counter 22 it to the amplifier 8. Thus, the rotation speed of the motor is increased. In the process of increasing the rotation speed of the motor, if the pulse frequency from the reflector 45 matches to the pulse frequency from the pulse oscillator 41, the phases of the pulses to the input terminals Rin and Sin of the comparator 24 match and the outputs $R_0$ and $S_0$ of the comparator 24 are both High. Thus, the counter 22 is held at the set state and the pulse from the output terminal of the register 20' selected at that time is applied to the amplifier 8 and the motor is rotated at the speed set by the potentiometer 50.

If the rotation speed of the motor is higher than the preset speed, the output $S_0$, of the comparator 24 is L and the counter 22 counts down so that the preceding stage output terminal of the register 20' is selected. As a result, the rotation speed of the motor decreases, and when the speed matches to the preset speed, the count-down of the counter 22 is stopped and the rotation speed is kept thereafter.

In the above rotation speed control, if all outputs $Q_0$-$Q_2$ of the counter 22 are H, that is, when the output $Q_8$ of the register 20' is selected and the motor is driven at the maximum speed, the AND gate 31 produces the H output to fire the light emitting diode 37 for warning, and the up input of the counter 22 is held at the H level so that the counter 22 is thereafter it to the amplifier 8. Thus, the rotation speed of the motor is increased. In the process of increasing the rotation speed of the motor, if the pulse frequency from the reflector 45 matches to the pulse frequency from the pulse oscillator 41, the phaees of the pulses to the input terminals Rin and Sin of the comparator 24 match and the outputs $R_0$ and $S_0$ of the comparator 24 are both High. Thus, the counter 22 is held at the set state and the pulse from the output terminal of the register 20' selected at that time is applied to the amplifier 8 and the motor is rotated at the speed set by the potentiometer 50.

If the rotation speed of the motor is higher than the preset speed, the output $S_0$ of the comparator 24 is L and the counter 22 counts down so that the preceding stage output terminal of the register 20' is selected. As a result, the rotation speed of the motor decreases, and when the speed matches to the preset speed, the countdown of the counter 22 is stopped and the rotation speed is kept thereafter.

In the above rotation speed control, if all outputs $Q_0$–$Q_2$ of the counter 22 are H, that is, when the output $Q_8$ of the register 20' is selected and the motor is driven at the maximum speed, the AND gate 31 produces the H output to fire the light emitting diode 37 for warning, and the up input of the counter 22 is held at the H level so that the counter 22 is thereafter affected by the output of the comparator 24.

On the other hand, if all outputs $Q_0$–$Q_2$ of the counter 22 are L, the inverting input AND gate 32 produces the H output to fire the light emitting diode 38 for warning, and the down input of the counter 22 is kept at the H level so that the counter 22 is thereafter not affected by the output of the comparator 24.

In accordance with the present invention, the phase difference between the periodic signals applied to the electrostrictive elements of the motor is controlled or the travelling wave state and the standing wave state are repeated to control the rotation speed. Accordingly, the speed control of the motor is attained by the very simple configuration and the motor can be rotated at any rotation speed without interrupting the rotation.

We claim:

1. A vibration wave motor for generating a travelling vibration wave in a first member by applying periodic signals of different phases to electro-mechanical energy conversion elements arranged at different positions on said first member and causing relative movement between said first member and a second member in contact with said first member, said electro-mechanical energy conversion elements being arranged at a first position and a second position on said first member, wherein said motor comprises:
   (a) a signal generating circuit for generating a periodic signal applied to an electro-mechanical energy conversion element provided at the first position on said first member;
   (b) a phase shift circuit for shifting the phase of the periodic signal generated by said signal generating circuit and for applying the phase shifted periodic signal to an electro-mechanical energy conversion element provided at the second position on said first member;
   (c) a speed designation circuit for generating a designated speed signal;
   (d) a monitor circuit for detecting the rotation speed of the motor and generating a detected speed signal;
   (e) a comparing circuit for comaring said designated speed signal and said detected speed signal and for outputting a first output when said designated speed signal corresponds to a higher speed than the speed corresponding to said detected speed signal and for outputting a second output when both of said signals correspond to substantially the same speed; and
   (f) a setting circuit for setting the amount by which said phase shift circuit shifts the phase of the periodic signals generated by said signal generating circuit, said setting circuit gradually changing the amount by which said phase shift circuit shifts the phase from an initial amount in response to said first output of said comparing circuit during the outputting of said first output by said comparing circuit and stopping the changing of the phase shifting in response to the outputting of said second output by said comparing circuit.

2. A vibration wave motor according to claim 1, wherein said electro-mechanical energy conversion elements are electrostrictive elements.

3. A vibration wave motor according to claim 1, wherein said electro-mechanical energy conversion elements are piezo-electric elements.

4. A vibration wave motor for generating a travelling vibration wave in a first member by applying periodic signals of different phases to electro-mechanical energy conversion elements arranged at different positions on said first member and causing relative movement between said first member and a second member in contact with said first member, comprising:
   (a) a first drive electrode for applying a periodic signal to said electro-mechanical energy conversion elements arranged at a first position;
   (b) a second drive electrode for applying a periodic signal of a different phase than the phase of the periodic signal applied to said first drive electrode, to the electro-mechanical energy conversion elements arranged at a second position; and
   (c) control means for continuously applying the periodic signal to said first drive electrode and intermittently applying said periodic signal to said second drive electrode.

5. A vibration wave motor according to claim 4 further comprising means for controlling a ratio of the intermittent application state and non-application state of the periodic signal by said control means to said second drive electrode.

6. A vibration wave motor according to claim 4, wherein said electro-mechanical energy conversion elements are electrostrictive elements.

7. A vibration wave motor according to claim 4, wherein said electro-mechanical energy conversion elements are piezo-electric elements.

8. A vibration wave motor for generating a travelling vibration wave in a first member by applying periodic signals of different phases to electro-mechanical energy conversion elements arranged at different positions on said first member and causing relative movement between said first member and a second member in contact with said first member, comprising:
   (a) a first drive electrode for applying a periodic signal to said electro-mechanical energy conversion elements arranged at a first position;
   (b) a second drive electrode for applying a periodic signal of a different phase than the phase of the periodic signal applied to said first drive electrode, to the electro-mechanical energy conversion elements arranged at a second position; and (c) a control circuit adapted to assume a first mode in which the periodic signals are applied to said first and second electrodes continuously to generate a vibration wave in said first member and a second mode in which the periodic signal is applied to said first electrode continuously and the application of the periodic signals of the same phase are applied to said first and second electrodes to generate a standing wave in the first member, said control circuit repeatedly and alternately assuming said first and second modes.

9. A vibration wave motor according to claim 8, wherein said electro-mechanical energy conversion elements are electrostrictive elements.

10. A vibration wave motor according to claim 8, wherein said electro-mechanical energy conversion elements are piezo-electric elements.

11. A vibration wave motor according to claim 8, further comprising means for varying the ratio of the time said control circuit operates in said first and second modes in one cycle.

* * * * *

UNITED STATES PATENT AND TRADEMARK OFFICE
CERTIFICATE OF CORRECTION

PATENT NO. : 4,794,294

DATED : December 27, 1988

INVENTOR(S) : Shimizu, et al.

It is certified that error appears in the above-identified patent and that said Letters Patent is hereby corrected as shown below:

COLUMN 1

Line 13, "an" should read --the--.
Line 46, "repeatedly should read --repeatedly to--.

COLUMN 4

Line 13, "is" should be deleted.
Line 28, "to th" should read --to the--.
Line 62, "copparator" should read --comparator--.
Line 67, "the ooutput" should read --the output--.

COLUMN 5

Line 3, "of wave" should read --of a wave--.

COLUMN 6

Line 18, "same" should read --same elements--.

UNITED STATES PATENT AND TRADEMARK OFFICE
CERTIFICATE OF CORRECTION

PATENT NO. : 4,794,294

DATED : December 27, 1988

INVENTOR(S) : Shimizu, et al.

It is certified that error appears in the above-identified patent and that said Letters Patent is hereby corrected as shown below:

COLUMN 7

Line 10, "9020" should read --90°--.
Line 17, "9020" should read --90°--.
Line 21, "9020" should read --90°--.
Line 33, "and" should read --and is--. (1st occurrence)
Line 39, "1-1 as" should read --1-1.  As--.

COLUMN 8

Line 28, "rotarded" should read --retarded--.
Line 28, "9020" should read --90°--.

COLUMN 9

Line 31, "select" should read --selects--.

COLUMN 10

Line 40, "counter 22" should read --counter 22, to count up.  As a result, the multiplexor 21 selects a pulse from the succeeding stage output terminal of the register 20' and supplies--.
Line 66, "it to the amplifier 8." should be deleted.
Lines 67-68, "delete lines 67-68 in their entirety.

UNITED STATES PATENT AND TRADEMARK OFFICE
CERTIFICATE OF CORRECTION

PATENT NO. : 4,794,294  Page 3 of 3
DATED : December 27, 1988
INVENTOR(S) : Suzuki, et al.

It is certified that error appears in the above-identified patent and that said Letters Patent is hereby corrected as shown below:

COLUMN 11

Lines 1-23, delete lines 1-23 in their entirety.
Line 11, line 24, "so that the counter 22 is thereafter" should be deleted.
Line 66, "comaring" should read --comparing--.

Signed and Sealed this

Nineteenth Day of December, 1989

Attest:

JEFFREY M. SAMUELS

Attesting Officer    Acting Commissioner of Patents and Trademarks